United States Patent Office 2,876,102
Patented Mar. 3, 1959

2,876,102
CONFECTION STOCK COMPRISING CARBOXYMETHYL DEXTRAN

Leo J. Novak, Dayton, Ohio, assignor, by mesne assignments, to The Midland Chemical Corporation, Wilmington, Del.

No Drawing. Application December 10, 1956
Serial No. 627,119

8 Claims. (Cl. 99—134)

This invention relates to a confection and particularly to fudge, wherein a mixture of ingredients supplied in package form may be mixed with water and cooked to form a finished edible product.

One of the problems encountered with candy is the pronounced sweetness which tends to jade the appetite with the result that the amount of candy consumed by an individual is comparatively small. This pronounced even cloying sweetness results from the large amount of sugar used in making the candy. While sugar substitutes which are less sweet than ordinary table sugar are known, the use of those substitutes is not desirable since they possess a taste and flavor of their own which changes the flavor of confections containing them. At the same time, a certain proportion of sugar or sugar substitute has been regarded as essential to a confection like fudge, for texture and other effects.

An object of this invention is to provide a mixture adapted to be made into fudge of reduced sweetness while at the same time having the consistency and palatability of conventional fudge.

Another object is to provide a novel mixture of dry ingredients adapted to be mixed with water and cooked to provide a fudge which is less sweet than usual but which is satisfying and can be eaten in larger quantity, or more frequently, without satiation, than is normally the case.

These and other objects of the invention are accomplished by providing a prepared fudge mix in which a portion of the sugar normally present is replaced by a specific carboxymethyl ether of a native, water-soluble, dextrant which is preferably linear or substantially linear (94% to 97% 1,6 linkages), said ether containing from about 1.5 to 3.0, preferably about 1.5 to 2.0 carboxymethyl groups per anhydroglucose unit of the dextran.

In accordance with the invention, the ingredients required for preparing the fudge are combined in dry condition and made up in a complete package similar to packages containing pancake and other cake mixes so that an individual who is not skilled in candy making can readily mix and cook the ingredients and, if desired, modify the candy by the inclusion of mashmallow paste.

By providing the dry ingredients in scientifically premixed condition, and in which a portion, usually from 5% to 10% of the sugar normally used is replaced by the specific carboxymethyl dextran, it becomes possible to prepare fudge having a satisfying sweetness but which is not so sweet as to dull the palate, not only because some of the sugar is replaced by the carboxymethyl dextran but also because, due to the highly hydrophilic property of the dextran ether, and its capacity to thicken or gel water, when it is used the sugar content may be still further reduced by replacing from 10% to 30% thereof with water without adverse effect on the fudge texture, and even with improvement in the texture. This water is incorporated in the prepared mix and is distinct from the water used in making up the fudge.

The invention provides fudge mixes in dry or dehydrated form which, although dehydrated, do not lose their normal flavor or other desirable characteristics and, when opened, mixed with water and cooked, provide fudge confections which are palatable and have the taste and flavor of freshly prepared fudge except that the sweetness is less prounounced. The invention also provides fudge ingredients in drying form which require the addition of water only, and cooking, to yield confections of excellent taste and texture. It also provides confections of the fudge type which are less fattening than conventional fudge containing large amounts of sugar.

In general, the mixture to be packaged in the dry form and then made up with water and cooked to provide the fudge, consist of a mixture of the carboxymethyl dextran as described generally above, granulated sugar, powdered whole milk, powdered skim milk, powdered whole roasted milk, cream, cocoa, vanilla and cream of tartar in such proportions that when made up with water and cooked a wholly satisfactory fudge confection is obtained. The confection, after cooking, may be modified by the addition of marshmallow, if desired.

The carboxymethyl dextran used in the fudge mixtures may be obtained by acting on the selected water-soluble native, linear or substantially linear dextran with a carboxymethylating agent in an aqueous alkaline medium, whereby the carboxymethyl group is substituted for one or more hydroxyl groups in the dextran molecule, with production of an ether. Suitable carboxymethylating agents are chloracetic acid, sodium chloracetate or chloracetamide. The reaction thereof with the dextran is carried out in an aqueous solution of a strong alkali metal hydroxide such as sodium, potassium or lithium hydroxide.

Preferably, the dextran is treated, in aqueous solution or suspension, with an excess of sodium or potassium chloracetate in the presence of an excess of sodium or potassium hydroxide at a temperature of 50° C. to 100° C. for a time ranging from about ten minutes to two hours. Preferably, also, the molar ratio of sodium chloracetate or potassium chloracetate to dextran is between 2:1 and 12:1, the molar ratio of sodium or potassium hydroxide to dextran is between 5:1 and 15:1, and the molar ratio of the water to dextran is between 70:1 and 120:1.

The conditions are selected so that the ethers obtained have a D. S. (degree of substitution or average number of carboxymethyl groups per anhydroglucopyranosidic unit) of at least 1.5 and up to 3.0.

The reaction product is a viscous mass comprising the sodium or potassium salt of the dextran ether, from which the salt may be precipitated by means of a water miscible alcohol, e. g., methyl, ethyl, propyl, isopropyl or t-butyl or a ketone such as acetone.

The free ether may be recovered from the salt by mixing the latter with water, acidifying to a pH of about 2.0, and precipitating the carboxymethyl dextran from the acid medium by addition of an aliphatic water-miscible alcohol or ketone. Precipitation of the ether at pH 2.0 is not critical, as other acid pH values may be used, but the highest yields of the ether have been obtained by precipitation at pH 2.0.

The native dextran from which the ethers are derived is produced under conventional conditions by the action of specific dextran-producing strains of Leuconostoc on sucrose present in an aqueous nutrient medium also containing appropriate inorganic salts, and is precipitated, purified and used in preparing the particular carboxymethyl dextrans without being subjected to hydrolyzing conditions. It has an extremely high molecular weight, in the millions as estimated from light scattering measurements. The dextrans used in preparing the ethers to be used in the present confection mix are produced by microorganisms bearing the following NRRL (Northern Regional Research Laboratory) designations: *Leuconostoc mesenteroides* B–1146, B–1064, B–1119, B–512, B–1066, B–1414. The native dextrans produced by all of these strains are highly linear, water-soluble and contain 1,6 linkages to the extent of 94% to 97% of the total linkages.

In preparing a fudge making pre-mix in accordance with this invention, the following ingredients may be used:

1 cup sugar
0.1 to 1 cup of the carboxymethyl dextran (preferably 0.2 cup)
0.1 to 1 cup water (preferably 0.8 cup)
2 level tablespoons of powdered whole milk
1 level tablespoon of powdered skim milk
1 level tablespoon of powdered whole roasted milk
1 level teaspoon of powdered cream
4 level tablespoons of cocoa
¼ level teaspoon of powdered vanilla
¼ level teaspoon of cream of tartar This formula or recipe is designed to be made into chocolate fudge. It will be understood that both the ingredients and the proportions thereof may be altered, and other flavoring agents used.

The dry ingredients may be mixed together by any suitable means and, after being thoroughly mixed, may be placed in packages which are properly sealed to make them airtight. The water added is taken up and held by the carboxymethyl dextran so that it does not affect the dryness of the mix.

With the mixture described, or any suitable variation thereof, fudge may be prepared readily by adding the mixture to cold water, with continuous stirring, and then heating it over a low fire while stirring it continuously to prevent sticking. When the mass is homogeneous, the heat may be increased, stirring being continued, to the boiling point at which temperature the mass may be maintained for a short time (5–10 minutes) before it is removed from the heat. After it is removed from the heat, the stirring is discontinued and the mass is allowed to cool. If desired, marshmallow may be added to the cooled mass and the mass beaten. It is then poured into a pan or onto a flat greased surface for cooling and setting.

Specifically, the ingredients mixed together may consist of:

| | Percent |
|---|---|
| Carboxymethyl dextran as defined herein | 10.00 |
| Water | 30.00 |
| Sugar | 40.00 |
| Powdered whole milk | 05.3 |
| Powdered skim milk | 02.3 |
| Powdered roasted milk | 02.3 |
| Powdered cream | 0.7 |
| Vanilla | 0.2 |
| Cocoa | 09.2 |
| Cream of tartar | 0.2 |

This mixture which is essentially dry due to absorption of the water by the carboxymethyl dextran may be provided in a sealed package or closed container and may be marketed as such, optionally with a separate sealed package or container holding about two ounces of marshmallow.

The contents of a package of the ingredients enumerated in substantially the proportions given, except for the marshmallow, may be placed in a two-quart utensil, one-half cup of cold water added, and the whole thoroughly mixed. The utensil holding the mix may be placed over a low fire and stirred for about five minutes. The heat is then increased to a medium fire, the stirring being continued, and the cooking being continued until the boiling point of the mix is reached, usually three to five minutes. The mix is then taken off the fire and cooled, the cooling being facilitated, if desired, by placing the utensil in cold water for a minute or so.

After the mix is cooled, two ounces of marshmallow may be added and the mass beaten vigorously for an additional couple of minutes, after which the beaten mass is poured into a buttered pan and allowed to set.

It will be understood that chopped nuts, cocoanut or the like may be added with the marshmallow or after the marshmallow has been beaten in. The final product is approximately one pound of fudge that is similar to conventional fudge in every respect except that, due to substitution of the 10% specific carboxymethyl dextran and 20% water for 30% of the sugar normally used, the fudge has reduced sweetness and, as an incidental advantage, better keeping quality and longer shelf life, while the texture is just as desirable as when the mix is made up with 80% of sugar.

A higher proportion of the sugar, up to 70% of the normal, may be replaced by the carboxymethyl dextran.

The advantage of the carboxymethyl dextrans derived from the water-soluble native highly linear dextrans and containing a minimum of 1.5 carboxymethyl group per anhydroglucose unit is that these particular carboxymethyl dextrans have the capacity to thicken water and aqueous media to a remarkable extent. The minimum carboxymethyl group content is critical to this capacity of the ethers. The method of making these ethers, in aqueous media as described hereinabove, is specific and critical to ethers having the content of carboxymethyl groups required for significant thickening or gelling effect on water or aqueous media.

These carboxymethyl dextrans containing a minimum of 1.5 carboxymethyl groups per anhydroglucose unit cannot be produced by methods shown in the art for such substances as cellulose, dextrin and starch, and involving the reaction of the cellulose, or the like with sodium hydroxide in non-aqueous alcoholic medium to produce an alkali-substituted derivative and then reacting such derivative with chloracetic acid.

The effect of these carboxymethyl dextrans on water and aqueous media is strikingly different from the effect of the parent dextran which does not gel water or aqueous media and does not increase the viscosity of water or aqueous media to any marked extent. In fact, it is reported in the patent literature that, in order to obtain viscous aqueous solutions using native dextran it was found necessary to convert the dextran to a formaldehyde complex. Such complexes are not adapted to use in the present confections containing powdered milk since, even at room temperature, there is a tendency to formaldehyde evolution and, as is known, formaldehyde is a tanning agent for proteins which renders them insoluble.

The marked thickening effect of these carboxymethyl dextrans is not destroyed by cooking the mix to produce the fudge and plays a part in the production of the present confections by imparting good body and smooth texture thereto and minimizing graininess. It also permits of making palatable confections in which larger amounts of water and reduced amounts of sugar are used. Thus in the formula given above, there may be used 50% of water and only 20% of sugar, the thickening of the water by the carboxymethyl dextran serving to impart desired consistency to the confection which has less of a granular character than when large amounts of sugar are used. For special dietetic purposes, the sugar can be replaced by a sugar substitute such as Sucryl.

While illustrative embodiments have been described, it will be understood that changes and modifications may be made, such as the substitution of a carboxymethyl ether derived from a water-soluble, substantially linear dextran other than the ether of B–512 dextran given in the formula, and other variations, may be made without departing from the scope of the invention. It is not intended, therefore, to limit the invention except as defined in the appended claims.

What is claimed is:

1. A dry confection stock adapted to be mixed with water and cooked to produce fudge, said stock comprising granulated sugar and a carboxymethyl ether of a native, water-soluble, substantially linear dextran containing an average of a minimum of about 1.5 up to 3.0 carboxymethyl groups per anhydroglucose unit, the sugar being present in an amount which is from 5% to 50% less than the amount of sugar normally used in making fudge, the proportion of sugar to carboxymethyl dextran being approximately 40% to 10% respectively, based on the weight of the dry stock.

2. A dry confection stock adapted to be mixed with water and cooked to produce fudge, the stock comprising granulated sugar in an amount which is from 5% to 50% less than the amount of sugar normally used in making fudge, and a carboxymethyl ether of a native, water-soluble highly linear dextran containing an average of from a minimum of 1.5 up to 3.0 carboxymethyl groups per anhydroglucose unit, the total amount of sugar and carboxymethyl dextran being equal to the amount of sugar normally used in making fudge, the proportion of sugar to carboxymethyl dextran being approximately 40% to 10% respectively, based on the weight of the dry stock.

3. A dry confection stock adapted to be mixed with water and cooked to produce fudge, the stock comprising powdered milk, powdered cream, cocoa, cream of tartar, flavoring, granulated sugar and a carboxymethyl ether of a native, water-soluble, highly linear dextran containing an average of a minimum of 1.5 up to 3.0 carboxymethyl groups per anhydroglucose unit, the sugar being present in an amount which is 5% to 50% less than the amount of sugar normally present in fudge-making stock and the amount of sugar and of the carboxymethyl dextran combined being equal to approximately the amount of sugar normally present in fudge-making stock, and wherein from 5% to 30% of the sugar normally present is replaced by said carboxymethyl dextran.

4. A confection stock according to claim 3, characterized in that vanilla is used as the flavoring.

5. A confection stock according to claim 3, characterized in that the milk content includes roasted milk.

6. A confection stock according to claim 3, characterized in that the milk content includes whole, skim and roasted milk.

7. A dry confection stock adapted to be mixed with water and cooked to produce fudge, said stock comprising granulated sugar, a carboxymethyl ether of a native, water-soluble, highly linear dextran containing an average of a minimum of 1.5 up to 3.0 carboxymethyl groups per anhydroglucose unit, and added water absorbed by the carboxymethyl dextran, the sugar being present in an amount from 5% to 50% less than the amount of sugar normally included in fudge-making stock, and the total of the sugar, carboxymethyl dextran and the absorbed water being substantially equal to the amount of sugar normally used in fudge-making stock, the proportion of sugar to carboxymethyl dextran being approximately 40% to 10% respectively, based on the weight of the dry stock.

8. A dry confection stock adapted to be mixed with water and cooked to produce fudge, said stock comprising as major constituents carboxymethyl dextran, sugar and water, said water and carboxymethyl dextran being present constituting approximately the same amount as the sugar, and said dextran constituent being a carboxymethyl ether of a native, water-soluble, highly linear dextran containing an average of a minimum of 1.5 up to 3.0 carboxymethyl groups per anhydroglucose unit.

References Cited in the file of this patent
UNITED STATES PATENTS

| | | |
|---|---|---|
| 2,089,217 | Mahoney | Aug. 10, 1937 |
| 2,210,856 | Hellwig et al. | Aug. 6, 1940 |
| 2,495,217 | Annarilli | Jan. 24, 1950 |
| 2,609,368 | Gaver | Sept. 2, 1952 |